United States Patent [19]

de la Barre et al.

[11] Patent Number: 5,077,479
[45] Date of Patent: Dec. 31, 1991

[54] GAMMA CAMERA FITTED WITH A PIN-HOLE CONE FOR PHOTOGRAPHIC TYPE ACQUISTION

[75] Inventors: François de la Barre, Sevres; Christian Pare, Plaisir, both of France

[73] Assignee: Sopha Medical, Paris, France

[21] Appl. No.: 603,149

[22] Filed: Oct. 25, 1990

[30] Foreign Application Priority Data

Nov. 2, 1989 [FR] France ................... 89 14357

[51] Int. Cl.$^5$ ............................................. G01T 1/164
[52] U.S. Cl. ............................. 250/363.10; 378/148; 250/505.1
[58] Field of Search ................... 250/363.10, 505.1; 378/148

[56] References Cited

U.S. PATENT DOCUMENTS 4,061,919 12/1977 Miller et al. ................... 250/370
4,348,591 9/1982 Wunderlich ................... 250/505.1
4,959,547 9/1990 Carroll et al. ................... 250/336.1

OTHER PUBLICATIONS

Malamud et al. "Simple and Efficient System for Fast Interchange of Low Energy Collimators" J. Nucl. Med. (U.S.A.) (Dec. 1975) vol. 16, No. 12, pp. 1195–1196.
Journal of Nuclear Medicine, vol. 15, No. 2, Feb. 1974, R. A. Moyer, "A Low-Energy Multihole Converging Collimator Compared with a Pinhole Collimator", pp. 59–64.

Primary Examiner—Carolyn E. Fields
Assistant Examiner—James Beyer
Attorney, Agent, or Firm—Oblon, Spivak, McClelland, Maier & Neustadt

[57] ABSTRACT

A gamma camera of the invention fitted with a pin-hole cone for acquiring photographic type images, i.e. having a tungsten end fitting disposed at the small end of a truncated cone and provided with a pin-hole therethrough, is suitable for forming a point image of an object to be observed on the basis of gamma radiation emitted therefrom, transmitted through the pin-hole and magnified on reaching the inlet to the scintillator. The truncated cone is modular in structure: the pin-hole cone is mainly constituted by a base, a first truncated cone of suitable thickness for stopping low energy gamma radiation, and a second truncated cone superposable at will on the first so that the assembled cones are of sufficient thickness to stop high energy gamma radiation.

7 Claims, 2 Drawing Sheets

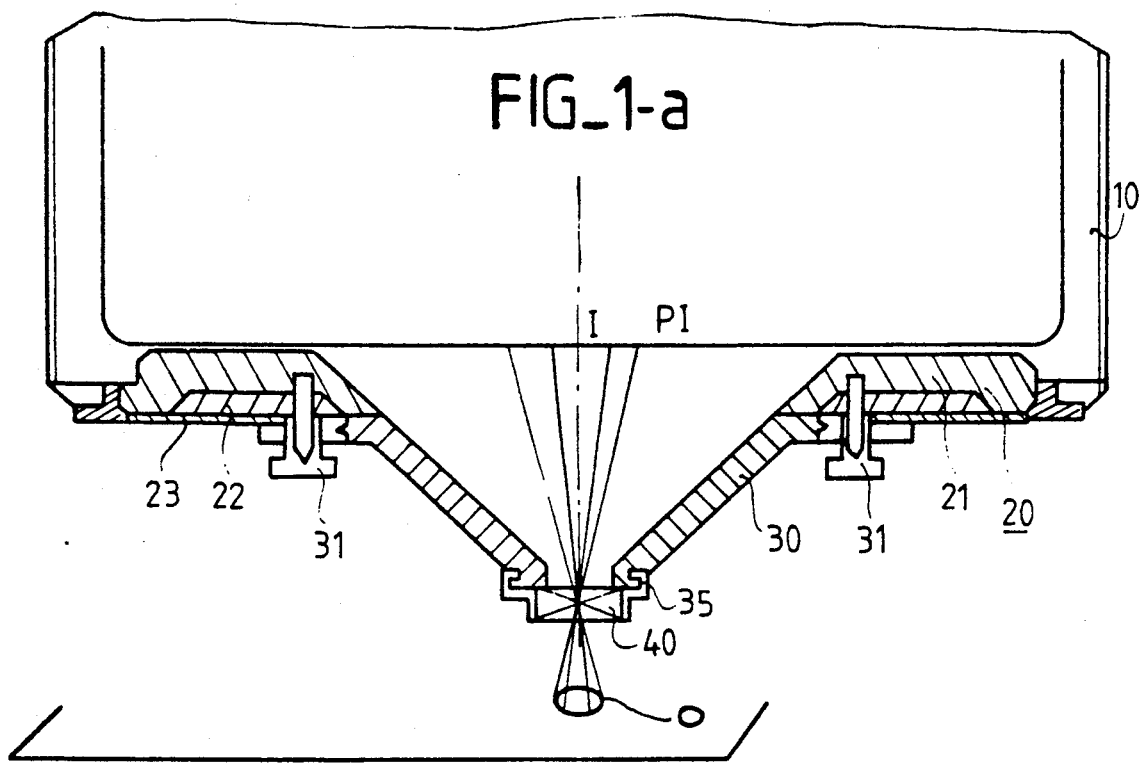
FIG_1-a
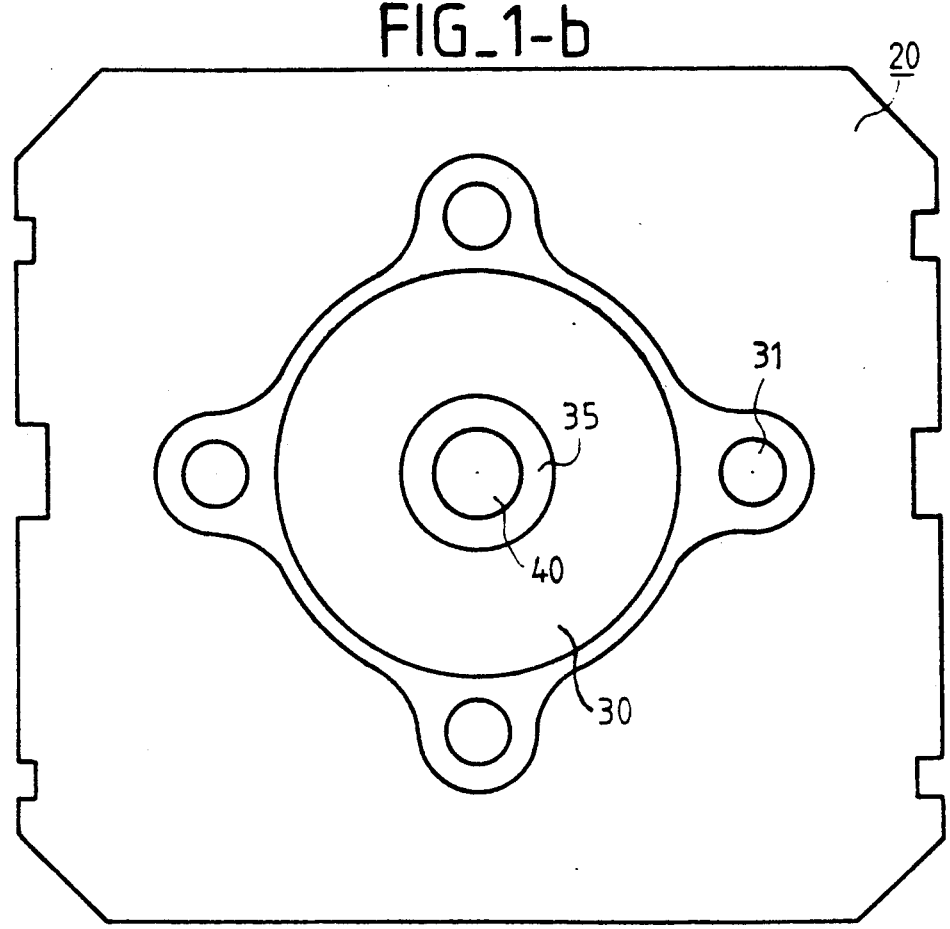
FIG_1-b

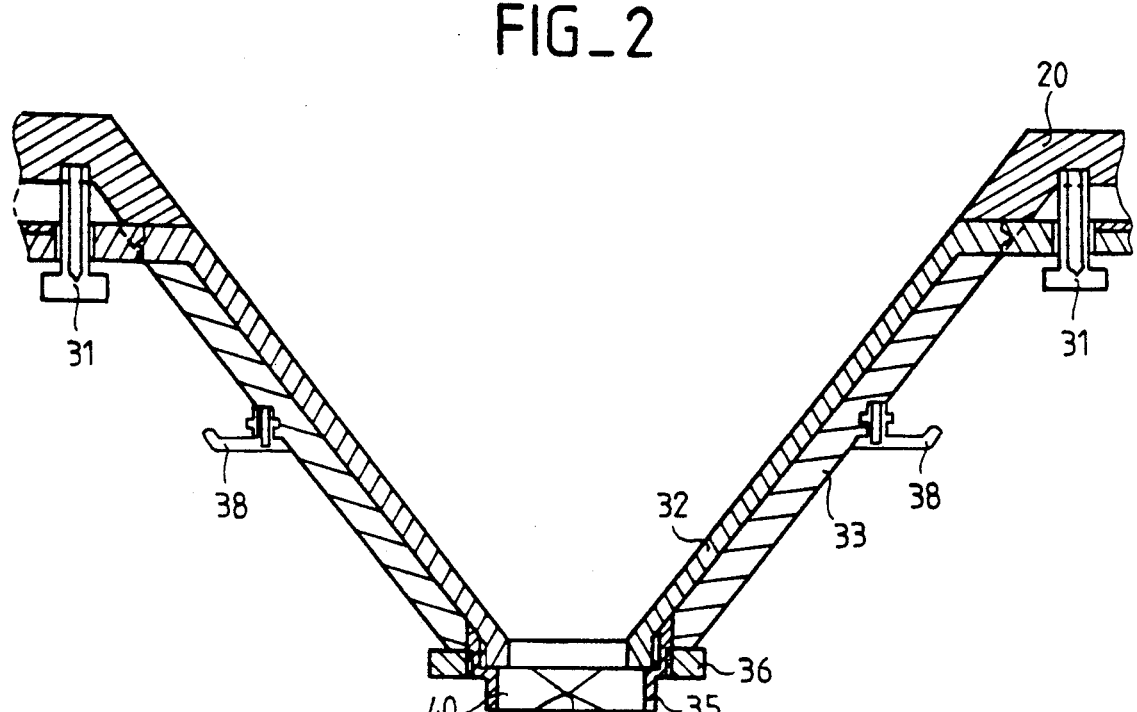
FIG_2
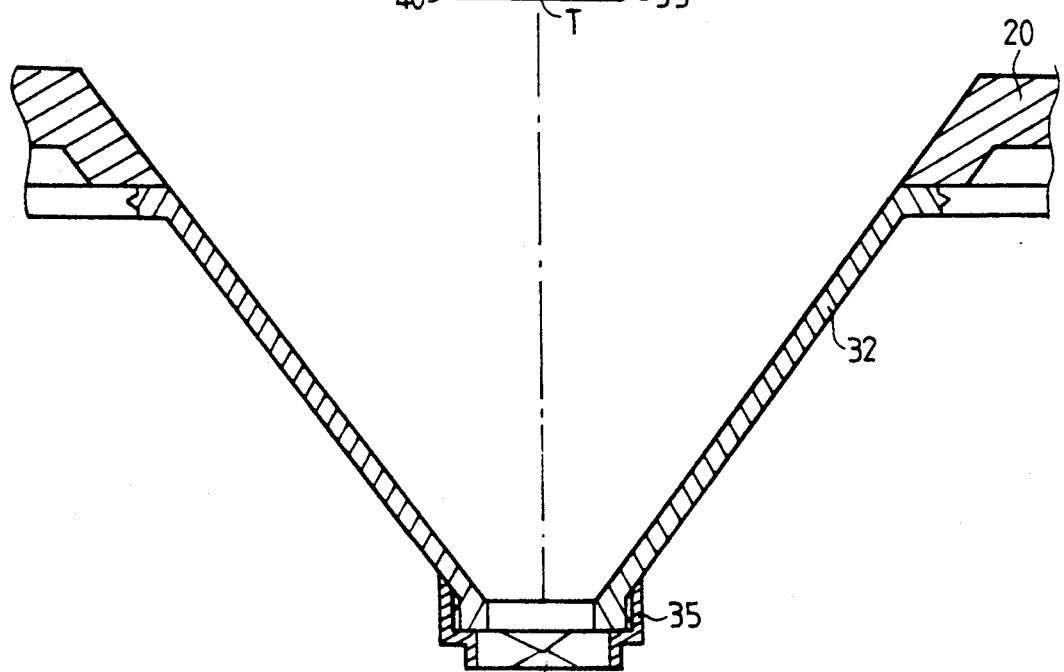
FIG_3

GAMMA CAMERA FITTED WITH A PIN-HOLE CONE FOR PHOTOGRAPHIC TYPE ACQUISTION

The invention relates to the field of medical imaging, and more particularly to a gamma camera or scintigraphic camera fitted with a pin-hole cone for acquiring "photographic" type images.

BACKGROUND OF THE INVENTION

Conventionally, when obtaining medical images by scintigraphy, a tracer substance containing a radioactive isotope is injected into the patient and attaches preferentially to the organ that is to be observed. The gamma rays emitted by the radioactive isotope are picked up by an image acquisition system of the gamma camera type.

For conventional image acquisition, this image-forming system includes a collimator which captures the radiation emitted in a given direction and the collimator is followed by a scintillator associated with a detector assembly.

In order to acquire photographic type images, the collimator of the gamma camera is replaced by a pin-hole cone, i.e. a cone which is closed by a tungsten end fitting having a hole through the center thereof which passes only a portion of the gamma radiation emitted by the zone under observation, with the remainder of the cone providing isolation from the gamma radiation emitted by the remainder of the body. Point images of radioactive isotope concentration in the zone under observation are thus formed by the "objective lens" constituted by the hole, and the scintillator placed at the base of the cone then forms a magnified image on the detector assembly. Resolution is thus improved over conventional acquisition and the smaller the hole the greater the accuracy.

In general, a given apparatus may be fitted either with a conventional collimator forming a 1 to 1 image of the zone under observation or else with a pin-hole cone. It is difficult to optimize the characteristics of the cone. Depending on the injected substance, the energy of the emitted gamma radiation varies over a wide range. In order to stop "low" energy radiation, a cone made of 7 mm thick lead suffices, whereas for stopping "high" energy radiation, it is necessary for the thickness of the cone to be as much as 20 mm. Several different pin-hole cones may therefore be provided for the same apparatus depending on the energy of the emitted radiation, which in turn depends on the substance injected.

These interchangeable components are heavy and machines are required to move them. A conventional collimator or a pin-hole cone commonly weighs about 100 kg (where the total weight of a gamma camera is about 1.5 metric tons). Even when a low energy cone is used, account must be taken of the fact that the camera needs to be balanced, so counterweights are provided. As a general rule, such counterweights are installed permanently. Consequently, the interchangeable parts, i.e. the collimator and the various cones, must all have approximately the same weight. The cones are therefore provided with bases that are designed to obtain the necessary weight.

An object of the invention is to provide a photographic type acquisition gamma camera in which the pin-hole cone is adaptable to the receive radiation energy while being much easier to install than the equivalent cone in conventional gamma cameras.

SUMMARY OF THE INVENTION

According to the invention, the pin-hole cone with which a gamma camera may be fitted is modular and comprises at least one base for mounting on the scintillator of the gamma camera, and a frustoconical portion which is separate from the base and which is capable of being fastened thereto by means of a screw system.

Preferably, the frustoconical portion is itself made up of two superposable truncated cones, the first truncated cone stopping low energy radiation, the second truncated cone, when superposed on the first, stopping high energy radiation, and since the different parts are mounted separately, the assembly is much easier to handle and provides greater flexibility in use for the operator.

BRIEF DESCRIPTION OF THE DRAWINGS

Embodiments of the invention are described by way of example with reference to the accompanying drawings, in which:

FIGS. 1a and 1b show a first embodiment of a gamma camera head fitted with a pin-hole cone of the invention, shown respectively in section and in plan view;

FIG. 2 is a section through a second embodiment of a gamma camera head of the invention having a cone made up of two portions; and FIG. 3 shows the same embodiment as that shown in FIG. 1 for use with low energy radiation.

DETAILED DESCRIPTION

As mentioned above, an essential characteristic of a gamma camera of the invention is that its pin-hole cone for mounting on the scintillator instead of the collimator, is modular. It comprises at least two separable portions: a base capable, initially, of being mounted on its own as is the case with a collimator; and a frustoconical portion provided with a tungsten endpiece at its end, as described above. The weight of the base, is such that when added to the weight of the truncated cone the assembly is equivalent in weight to the collimator that it replaces. In an improved embodiment, the truncated cone is itself modular comprising two separable and superposable truncated cones which are individually easier to handle, and no special apparatus is required for assembly.

FIGS. 1a and 1b show a gamma camera head fitted with a pin-hole cone of the invention. The body 10 of the head includes a scintillator and detector assembly (not shown). At one end, a base 20 comprises a base frame 21 made of lead, a ring 22 made of PVC or aluminum, for example, and a backing plate 23 made of aluminum and fixed to uprights on the head 10. A lead cone 30 of sufficient thickness for stopping high energy gamma radiation is added to the base 20. A screw system 31 enables the cone 30 to be fixed to the base 20. Finally, a ring 35 serves to close the truncated cone 30 by means of a tungsten end fitting 40 which is pierced by a pin-hole.

The base 20 thus constitutes a circular or rectangular ring (as shown in FIG. 1b) pierced by a hole and on which the base of the truncated cone 30 is fixed. This structure ensured that only radiation emitted by an "object" organ O is picked up inside the cone. This radiation passes through the pin-hole in the end fitting 40 constituting an "objective" lens, thereby forming an image I of the organ O under observation on the inlet plane of the scintillator PI. Gamma radiation from other portions of the body is stopped by the cone.

Since the base 20 is disassociated from the cone 30, it is easier to handle, and in particular it may be stored and installed in the same way as collimators for conventional acquisition gamma cameras since it is of substantially the same size. The conical portion is much easier to install than is a cone which is integral with its own base.

FIG. 2 shows an improved embodiment of the pin-hole cone for a gamma camera. In this figure, the cone comprises a first frustoconical portion 32 which, together with the base, constitutes a pin-hole assembly suitable for use with low energy gamma radiation since it is itself about 7 mm thick and made of a material which is preferably lead.

For use with high energy radiation, a second frustoconical portion 33 (e.g. 13 mm thick) likewise made of lead is super posed on the first, with the assembly of the two frustoconical portions 32 and 33 constituting a cone of sufficient thickness for stopping the high energy gamma radiation. The base 20 is made in the same way as before and is shown only in part in FIGS. 2 and 3. FIG. 3 shows the pin-hole cone for use at low energy, having only the 7 mm thick frustoconical portion 32. In both these figures, items that also appear in FIGS. 1a and 1b are given the same references, and this applies in particular to the screw system 31 serving to fix the base of the frustoconical portion 32 to the base 20, and to the ring 35 provided with the tungsten end fitting 40. The ring 35 surrounds the small end of the truncated cone and is screwed thereto. For high energy radiation, the truncated cone 33 is slid over the first truncated cone on which positioning lugs may be provided. A nut 36 is then screwed onto the ring 35, thereby locking the cone 33 into position pressed against the base of the cone 32. The angle at the apex of the cones 32 and 33 are the same so that the cones are exactly superposable. Handles 38 make it easy to remove the truncated cone 33 when necessary.

By way of example, in an embodiment of the invention as shown in FIGS. 2 and 3, the weight of the base 20 made up mainly of lead is 70 kg, the mass of the low energy cone 32 and its base parallel to the base 20 is 14.5 kg, and the mass of the additional cone 33 for use with high energy radiation is 13 kg, so that the entire assembly together with the fixing screws has a mass of about 100 kg. In this example, the equilibrium weight for the collimation portion is 91 kg, such that with or without the additional cone 33, the assembly is within ±6 kg of its equilibrium weight.

The invention is not limited to the embodiments described in greater detail above and shown in the drawings. The gamma camera pin-hole cone of the invention is modular, thereby making it easier to handle. In one embodiment, the cone is made up from two truncated cones. It is also possible to provide a cone built up from more than two portions if so justified by ease of installation and the energy ranges used.

We claim:

1. A gamma camera comprising:
    a camera body;
    a pin-hole cone assembly mounted on said camera body such that said camera body is balanced when said pin-hole cone assembly has a given equilibrium weight;
    a first truncated cone included in said pin-hole cone assembly having a thickness suitable for stopping low energy radiation, said first truncated cone having a tungsten end fitting with a pin-hole therethrough, the pin-hole being of a size suitable for passing only that gamma radiation which is suitable for forming an image;
    a second truncated cone included in said pin-hole cone assembly, said second truncated cone having means for superpositioning on the first truncated cone and having a thickness such that when said first and second truncated cones are superposed, the total thickness of said pin-hole cone assembly is suitable for stopping high energy gamma radiation;
    wherein the weight of said pin-hole cone assembly without the second truncated cone superposed on the first truncated cone is less than said given equilibrium weight, and wherein the weight of said pin-hole cone assembly with the second truncated cone superposed on the first truncated cone is greater than the equilibrium weight.

2. A gamma camera according to claim 1, wherein the tungsten end fitting is supported by a ring which is screwed to the small end of the first truncated cone, and wherein the second truncated cone is held against the first truncated cone by means of a nut tightened against said ring.

3. A gamma camera according to claim 1, wherein a base in the form of a ring is mounted on said camera body.

4. A gamma camera according to claim 3, wherein the total combined mass of the pin-hole cone assembly and the base plate is about 100 kg.

5. A gamma camera according to claim 3, wherein said first truncated cone is removably and replaceably mounted on said base.

6. A gamma camera according to claim 5, wherein said second truncated cone is removably and replaceably mounted on said first truncated cone.

7. A pin-hole cone assembly for a gamma camera comprising:
    a first truncated cone having a thickness suitable for stopping low energy radiation and having a tungsten end fitting with a pin-hole therethrough, the pin-hole being of a size suitable for passing only that gamma radiation which is suitable for forming an image in said gamma camera;
    a second truncated cone having means for superpositioning on the first truncated cone and having a thickness such that when said first and second truncated cones are superposed, the total thickness of said pin-hole cone assembly is suitable for stopping high energy gamma radiation;
    wherein the weight of said pin-hole cone assembly without the second truncated cone superposed on the first truncated cone is less than an equilibrium weight at which the gamma camera is balanced, and wherein the weight of said pin-hole cone assembly with the second truncated cone superposed on the first truncated cone is greater than the equilibrium weight at which the gamma camera is balanced.

* * * * *